(12) United States Patent
Murui et al.

(10) Patent No.: US 12,070,845 B2
(45) Date of Patent: Aug. 27, 2024

(54) ELECTRONIC POWER TOOL AND ELECTRIC POWER TOOL SYSTEM

(71) Applicant: Panasonic Intellectual Property Management Co., Ltd., Osaka (JP)

(72) Inventors: Itaru Murui, Nara (JP); Hiroaki Murakami, Mie (JP); Akiko Honda, Osaka (JP); Masanori Nakamoto, Mie (JP); Mitsumasa Mizuno, Osaka (JP); Takashi Kusagawa, Osaka (JP); Masahiro Sato, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 90 days.

(21) Appl. No.: 17/273,705

(22) PCT Filed: Jun. 26, 2019

(86) PCT No.: PCT/JP2019/025443
§ 371 (c)(1),
(2) Date: Mar. 4, 2021

(87) PCT Pub. No.: WO2020/049841
PCT Pub. Date: Mar. 12, 2020

(65) Prior Publication Data
US 2021/0331305 A1  Oct. 28, 2021

(30) Foreign Application Priority Data
Sep. 5, 2018  (JP) .............................. 2018-166426

(51) Int. Cl.
*B25B 23/147* (2006.01)
*B25F 5/00* (2006.01)
*G05B 15/02* (2006.01)

(52) U.S. Cl.
CPC ............... *B25F 5/00* (2013.01); *G05B 15/02* (2013.01); *B25B 23/147* (2013.01)

(58) Field of Classification Search
CPC .................... B25B 23/1425; B25B 23/147
(Continued)

(56) References Cited

U.S. PATENT DOCUMENTS 9,089,956 B2 * 7/2015 Arimura ............. B25B 23/1475
10,131,042 B2 * 11/2018 Mergener ............. B23B 45/008
(Continued)

FOREIGN PATENT DOCUMENTS

DE  102013016068 A1  4/2015
DE  102017202286 A1  8/2018
(Continued)

OTHER PUBLICATIONS

Extended European Search Report issued in corresponding European Patent Application No. 19856768.7, dated Oct. 18, 2021.
(Continued)

*Primary Examiner* — Thanh K Truong
*Assistant Examiner* — Patrick B Fry
(74) *Attorney, Agent, or Firm* — Rimon P.C.

(57) ABSTRACT

An electric power tool includes: a motor; an output shaft; and a power transmission mechanism that transmits a rotational output of the motor to the output shaft. A motor control unit controls rotation of the motor in accordance with an on operation of the user operation switch performed by a user. A detector detects physical quantity data while the motor is being rotated. A status determination unit determines whether the electric power tool is in a deteriorated status, by using the physical quantity data. A notification interface communicates that the electric power tool is in a deteriorated status while the motor is not being rotated.

6 Claims, 5 Drawing Sheets

(58) Field of Classification Search
USPC .......................................................... 173/20
See application file for complete search history.

(56) References Cited

U.S. PATENT DOCUMENTS

| | | | |
|---|---|---|---|
| 10,646,982 B2* | 5/2020 | Dey, IV | .............. B25B 23/1475 |
| 10,921,799 B2* | 2/2021 | Disisto | ..................... G07C 3/02 |
| 2016/0375570 A1* | 12/2016 | Boeck | ................ G05B 19/4062 |
| | | | 700/169 |
| 2017/0046663 A1 | 2/2017 | Wong et al. | |
| 2017/0173768 A1* | 6/2017 | Dey, IV | .............. B25B 23/1475 |
| 2018/0329407 A1* | 11/2018 | Disisto | ..................... G07C 3/02 |

FOREIGN PATENT DOCUMENTS

| | | |
|---|---|---|
| EP | 3135437 A1 | 3/2017 |
| JP | 2015-208820 | 11/2015 |
| JP | 2016-091316 | 5/2016 |
| WO | 2018042982 A1 | 3/2018 |
| WO | 2018/149727 A1 | 8/2018 |

OTHER PUBLICATIONS

International Search Report issued in corresponding International Patent Applicatoin No. PCT/JP2019/025443, dated Sep. 3, 2019, with English translation.

* cited by examiner

ELECTRONIC POWER TOOL AND ELECTRIC POWER TOOL SYSTEM

CROSS-REFERENCE OF RELATED APPLICATIONS

This application is the U.S. National Phase under 35 U.S.C. § 371 of International Patent Application No. PCT/JP2019/025443, filed on Jun. 26, 2019, which in turn claims the benefit of Japanese Patent Application No. 2018-166426, filed on Sep. 5, 2018, the entire disclosures of which Applications are incorporated by reference herein.

TECHNICAL FIELD

The present disclosure relates to an electric power tool and a system for managing the status of an electric power tool.

BACKGROUND ART

Patent literature 1 discloses a work management apparatus including a work information acquisition unit that acquires work information related to the content of work, a positional information acquisition unit that acquires positional information on a place of work, a workpiece information acquisition unit that acquires workpiece information, and an information management unit that stores the work information, the positional information, and the workpiece information in a storage unit, mapping the information to each other. The work management apparatus further includes a determination unit that determines the properness of a work by referring to data for a design drawing. The result of determining the properness of a work is displayed on a display unit.

[Patent Literature 1] JP2016-91316

SUMMARY

Technical Problem

When malfunction occurs in an electric power tool, it becomes difficult to manage the tightening torque of a screw material such as a screw and a bolt precisely. It is therefore necessary to evaluate the current status of the electric power tool and communicate the evaluated status to the user properly.

The disclosure addresses the above-described issue, and a general purpose thereof is to provide a technology used for status management of an electric power tool.

Solution to Problem

An electric power tool according to an embodiment of the present disclosure includes: a motor; an output shaft on which a front-end tool is adapted to be mounted; a power transmission mechanism that transmits a rotational output of the motor to the output shaft; a user operation switch for rotating the motor; a motor control unit that controls rotation of the motor in accordance with an on operation of the user operation switch performed by a user; a detector that detects physical quantity data while the motor is being rotated; a status determination unit that determines whether the electric power tool is in a deteriorated status, by using the physical quantity data; and a notification interface that communicates that the electric power tool is in a deteriorated status while the motor is not being rotated.

Another embodiment of the present disclosure relates to an electric power tool system including an electric power tool and a server system, the electric power tool including: a motor; an output shaft on which a front-end tool is adapted to be mounted; a power transmission mechanism that transmits a rotational output of the motor to the output shaft; a user operation switch for rotating the motor; a motor control unit that controls rotation of the motor in accordance with an on operation of the user operation switch performed by a user; a detector that detects physical quantity data while the motor is being rotated; and a tool-side transmission unit that transmits the physical quantity data detected to the server system while the motor is not being rotated. The server system includes: a server-side reception unit that receives the physical quantity data transmitted; a status determination unit that determines whether the electric power tool is in a deteriorated status, by using the physical quantity data; and a server-side transmission unit that transmits determination data yielded by the status determination unit to the electric power tool. The electric power tool includes: a tool-side reception unit that receives the determination data transmitted; and a notification interface that communicates that the electric power tool is in a deteriorated status while the motor is not being rotated.

Optional combinations of the aforementioned constituting elements, and implementations of the present disclosure in the form of devices, systems, computer programs, recording mediums recording computer programs, etc. may also be practiced as additional modes of the present disclosure.

DESCRIPTION OF EMBODIMENTS

Figure 1:
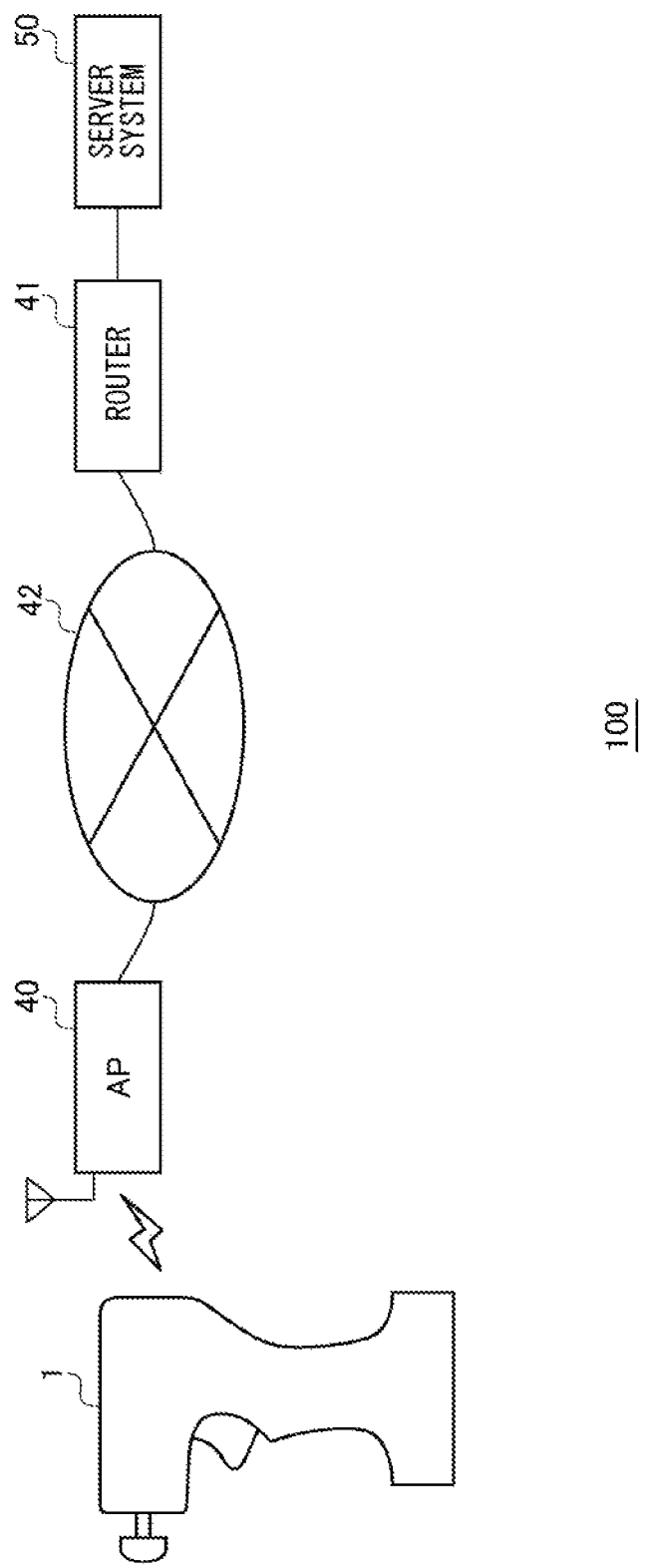
FIG. 1 shows a configuration of an electric power tool system according to an embodiment.

FIG. 1 shows a configuration of an electric power tool system 100 according to an embodiment. The electric power tool system 100 includes an electric power tool 1 and a server system 50. An access point (hereinafter, "AP") 40 is interconnected with the electric power tool 1, which is a wireless LAN client, and is connected to an external network 42 such as the Internet. A router 41 is connected to the server system 50 by wire and is connected to the network 42. The electric power tool 1 and the server system 50 are communicably connected via the network 42.

Figure 2:
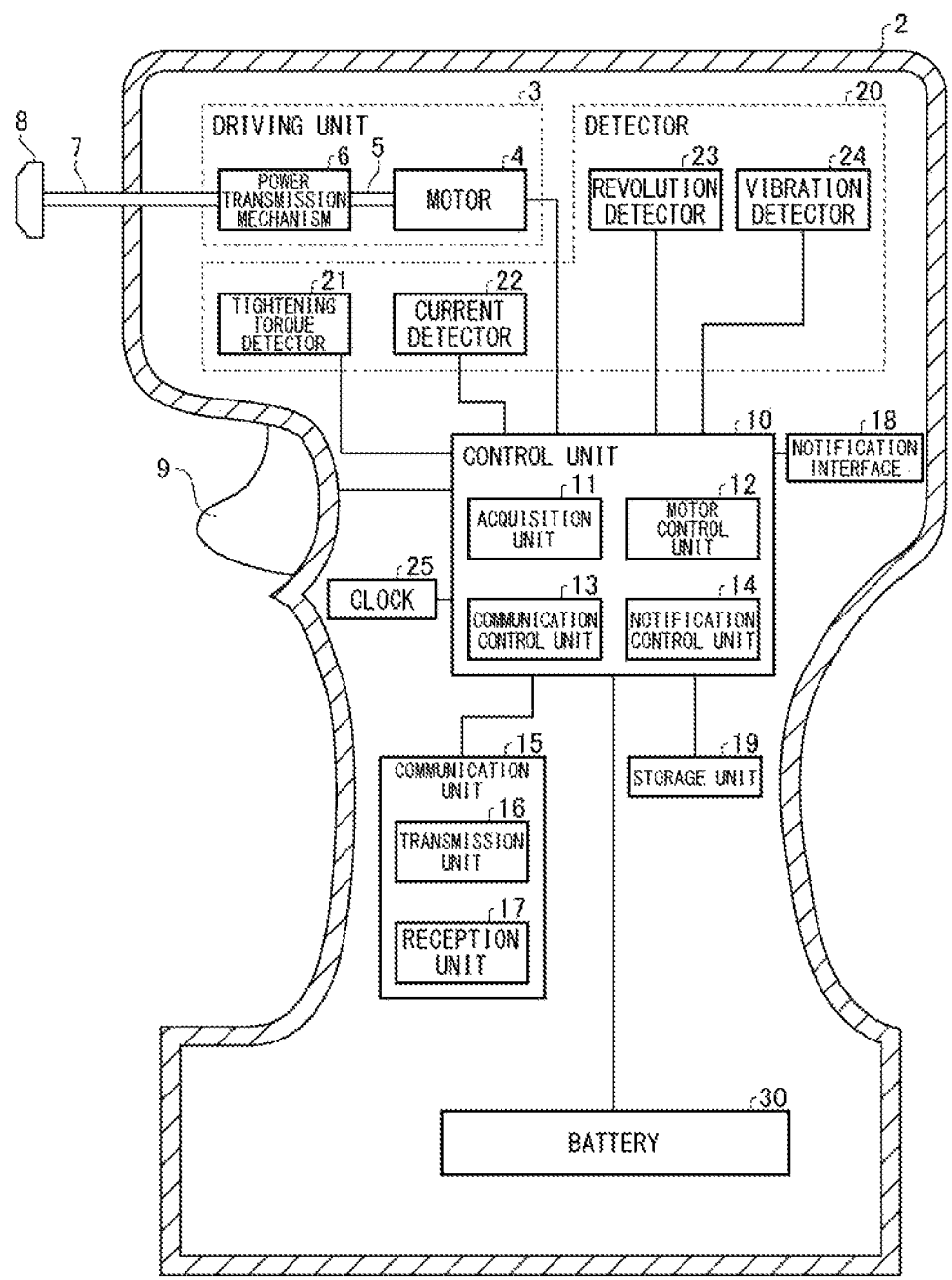
FIG. 2 shows functional blocks of the electric power tool according to the embodiment.

FIG. 2 shows functional blocks of the electric power tool 1 according to the embodiment. An electric power tool 1 includes a housing 2. A driving unit 3, a control unit 10, a communication unit 15, a notification interface 18, a storage unit 19, a detector 20, a clock 25, and a battery 30 are provided in the housing 2. The battery 30 is mounted on the lower end of the housing 2 to supply electric power to the constituting elements of the electric power tool 1. The lower end of the housing 2 may be formed as a battery pack separate from the main body of the tool and configured to be removably attached to the main body of the tool. The clock 25 is a real-time clock. The clock 25 generates current date and time information and supplies the information to the control unit 10.

The driving unit 3 includes the motor 4, which is driving source, and a power transmission mechanism 6 coupled to a motor shaft 5 of the motor 4 to drive the output shaft 7. A front-end tool mount 8 is coupled to the output shaft 7, and a front-end tool such as a driver that applies a tightening torque to a screw member is adapted to be mounted on the front-end tool mount 8. The power transmission mechanism 6 is a mechanism that transmits the rotational output of the motor 4 to the output shaft 7. The power transmission mechanism 6 may include a planetary gear deceleration mechanism in mesh with a pinion gear attached to the motor shaft 5. The electric power tool 1 according to the embodiment is a rotary impact tool, and the power transmission mechanism 6 includes an impact mechanism for applying an intermittent rotary impact force to the output shaft 7.

The detector 20 detects physical quantity data in the electric power tool 1 while the motor 4 is being rotated. The detector 20 may include a tightening torque detector 21, a current detector 22, a revolution detector 23, and a vibration detector 24. The tightening torque detector 21 detects the tightening torque of the screw member. The tightening torque detector 21 may include a magnetostrictive torque sensor attached to the output shaft 7 and a rotation angle sensor of the output shaft 7. The torque sensor uses a coil provided in a non-rotated part to detect the variation in magnetic permeability determined by the axial distortion caused by applying a torque to the output shaft 7 and outputs a voltage signal determined by the distortion. The rotation angle sensor outputs the rotation angle of the output shaft 7. The tightening torque detector 21 uses the voltage signal determined by the distortion and the rotation angle of the output shaft 7 to calculate and output the tightening torque of the screw member.

The current detector 22 detects an electric current supplied to the motor 4. The revolution detector 23 detects the number of revolutions (rotation speed) of the motor 4. The revolution detector 23 may be a magnetic rotary encoder, a Hall element IC, etc. that detects the rotation angle of the motor 4. The vibration detector 24 detects the vibration generated in the housing 2. The vibration detector 24 may be a displacement sensor, a speed sensor, or an acceleration sensor and may be formed by an electromagnetic element, a piezoelectric element, a capacitance element, etc.

The communication unit 15 includes a transmission unit 16 and a reception unit 17. The communication unit 15 may be a module configured to communicate wirelessly with the AP 40 according to a communication protocol such as the IEEE802.11 protocol. The communication unit 15 may also include a wireless communication function in the fourth-generation mobile communication system. The communication unit 15 may not be a wireless communication module but a module configured to communicate with an external device by wire via, for example, a USB cable.

The notification interface 18 is an output interface for outputting information to the user. The notification interface 18 may include a speaker for audio output of information and/or a display for outputting information on a screen. The storage unit 19 is a memory and includes a read only memory (ROM) and a random access memory (RAM). The ROM stores at least identification information (tool ID) for identifying the electric power tool 1. The ROM further stores a control program used by the motor control unit 12. The RAM stores the information transmitted from the transmission unit 16 temporarily and stores the information received by the reception unit 17 temporarily.

The electric power tool or the entity that executes the method according to the disclosure is provided with a computer. By causing the computer to run a program, the function of the tool or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the integration degree, and the processor may be comprised of a system LSI, a very large scale integration (VLSI), or an ultra large scale integration (USLI). A field programmable gate array (FPGA) programmed after the LSI is manufactured, or a reconfigurable logic device, in which the connections inside the LSI are reconfigurable or the circuitry blocks inside the LSI can be set up, can be used for the same purpose. The plurality of electronic circuits may be integrated in one chip or provided in a plurality of chips. The plurality of chips may be aggregated in one device or provided in a plurality of apparatuses. The program is recorded in a non-transitory recording medium such as a computer-readable ROM, optical disk, and hard disk drive. The program may be stored in a recording medium in advance or supplied to a recording medium via wide area communication network including the Internet.

The control unit 10 is implemented by a computer carried on a control board. The control unit 10 has the function for integrated control of the electric power tool 1 and performs various processes related to the electric power tool 1. The control unit 10 includes an acquisition unit 11, a motor control unit 12, a communication control unit 13, and a notification control unit 14. The motor control unit 12 controls the rotation of the motor 4.

The acquisition unit 11 acquires physical quantity data detected while the motor 4 is being rotated. The physical quantity data detected while the motor 4 is being rotated may at least include physical quantity data detected by the detector 20. In other words, the acquisition unit 11 acquires the tightening torque value from the tightening torque detector 21, the motor current value from the current detector 22, the number of revolutions of the motor from the revolution detector 23, and the vibration data from the vibration detector 24 while the motor 4 is being rotated. The acquisition unit 11 stores the physical quantity data and time information related to the time when the physical quantity data is acquired in the storage unit 19, mapping the data and the information to each other.

The time information mapped to the physical quantity data may be the absolute time information indicating the current time supplied from the clock 25. The mapped time information may be the relative time information indicating the time elapsed since the reference time (e.g., the date and time of manufacturing or the date and time of first use). The storage unit 19 stores the physical quantity data and the time information related to the time when the physical quantity data is acquired, mapping the data and the information to each other.

The frontward grip portion of the housing 2 is provided with a user operation switch 9 that can be manipulated by the user. The user operation switch 9 may be a trigger switch that can be pulled by the user for manipulation to rotate the motor 4. The motor control unit 12 controls the rotation of the motor 4 in accordance with the on operation (turn-on operation) of the user operation switch 9 performed by the user. More specifically, the motor control unit 12 controls the current applied to the motor 4 in accordance with how much the user operation switch 9 is manipulated to adjust the number of revolutions of the motor. A target torque value to be achieved by the current work is set in the storage unit 19 before the work is started. The motor control unit 12 monitors the tightening torque value detected by the tightening torque detector 21. When the tightening torque value reaches the target torque value, the rotation of the motor 4 is automatically stopped. The tightening torque of the screw member is managed by performing the control as described above.

The communication control unit 13 controls the transmission operation performed by the transmission unit 16 and the reception operation performed by the reception unit 17. The communication unit 15 is connected to the server system 50 via the network 42. In the electric power tool system 100 of the embodiment, the communication control unit 13 causes the physical quantity data and the time information to be transmitted from the transmission unit 16 to the server system 50 while the motor is not being rotated.

While the motor 4 is being rotated, vibration or noise is generated in the electric power tool 1 so that the communication environment is not necessarily favorable. This is addressed by causing the transmission unit 16 to transmit the physical quantity data and the time information stored in the storage unit 19 to the server system 50 while the motor 4 is not being rotated. It is preferred that the transmission unit 16 transmit the physical quantity data and the time information acquired in relation to a single tightening work to the server system 50 after the work is completed.

Figure 3:
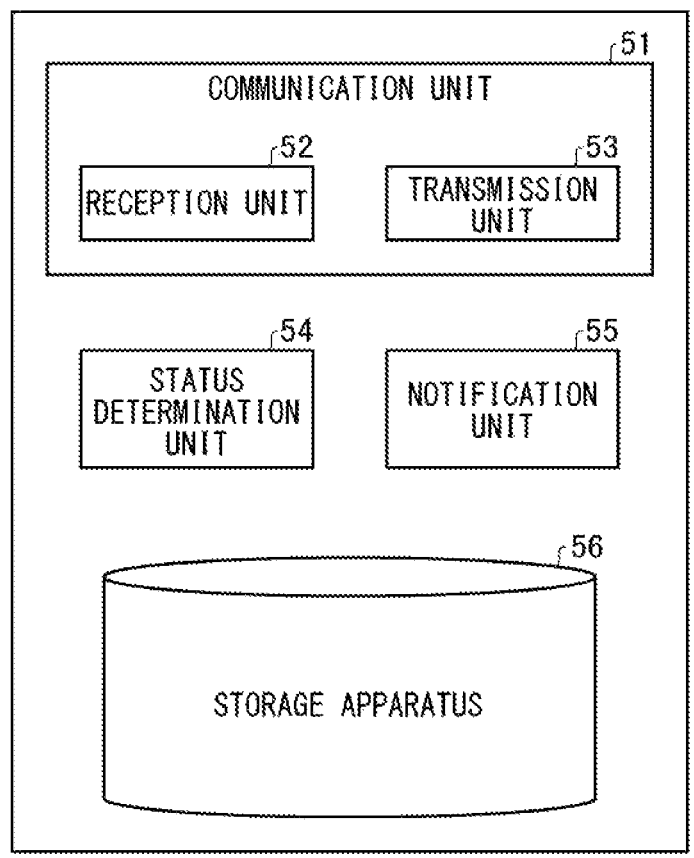
FIG. 3 shows functional blocks of the server system according to the embodiment.

FIG. 3 shows functional blocks of the server system 50 according to the embodiment. The server system 50 includes a communication unit 51, a status determination unit 54, a notification unit 55, and a storage apparatus 56. The communication unit 51 includes a reception unit 52 and a transmission unit 53.

The server system 50 may be operated and managed by, for example, an entity manufacturing the electric power tool 1. FIG. 1 shows that the server system 50 is connected only to one electric power tool 1, but the server system 50 is connected to a plurality of electric power tools 1 and receives the physical quantity data and the time information acquired in the respective electric power tools 1. The transmission unit 16 in the electric power tool 1 transmits the physical quantity data and the time information to the server system 50, mapping the data and the time information to the tool ID of the electric power tool 1.

The reception unit 52 receives the physical quantity data and the time information transmitted from the electric power tool 1. The storage apparatus 56 stores the physical quantity data and the time information received, mapping the information to the tool ID of the electric power tool 1. The status determination unit 54 determines whether the electric power tool is in a deteriorated status by using the physical quantity data and the time information received.

The server system 50 may be configured to include one or a plurality of processing apparatuses. For example, the server system 50 may include a collection apparatus that collects the physical quantity data transmitted from the electric power tool 1 and an evaluation apparatus that evaluates the status of the electric power tool 1 by using the collected physical quantity data. In this case, the communication unit 51 and the storage apparatus 56 shown in FIG. 3 may be provided as features on the side of the collecting apparatus, and the status determination unit 54 and the notification unit 55 may be provided as features on the side of the evaluation apparatus.

Figure 4:
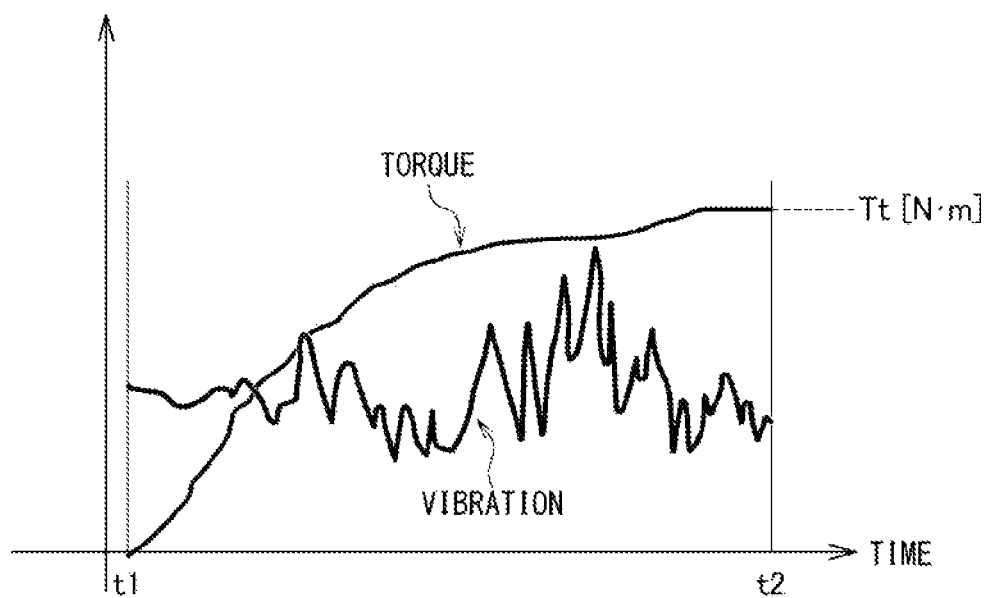
FIG. 4 shows examples of physical quantity data and time information.

FIG. 4 shows examples of physical quantity data and time information received for a single work. Of the physical quantity data, FIG. 4 shows a relationship between the tightening torque value and the vibration data. This example shows the variation in the physical quantity data during a period between the time (t1) when the tightening torque value is detected to exceed 0 and the time (t2) when the tightening torque value reaches the target torque value (Tt[N·m]) and the motor 4 is automatically stopped.

The storage apparatus 56 stores a collection of a plurality of sets of physical quantity data and time information acquired for each of the works in the past, mapping the data and information to the tool ID. When the reception unit 52 receives the physical quantity data and the time information mapped to the tool ID, the status determination unit 54 reads the physical quantity data and the time information mapped to the same tool ID from the storage apparatus 56 to analyze the temporal transition of the status of the electric power tool 1 and determine whether the current physical quantity data shows deterioration.

More specifically, when the status determination unit 54 refers to the data for the current tightening torque value and determines that the ultimate tightening torque value is Tt[N·m], the status determination unit 54 refers to the physical quantity data stored in the past to identify physical quantity data for which the ultimate tightening torque value is Tt[N·m]. The status determination unit 54 uses data indicating the change in the tightening torque value occurring as works have been performed a predetermined number of (e.g., 50) times in the immediate past to determine an average time (Ts) elapsed since the point of time when the tightening torque value exceeds 0 until it reaches Tt[N·m]. For example, the status determination unit 54 may calculate and maintain, for each ultimate tightening torque value, the average time Ts required to reach the ultimate tightening torque in advance.

The status determination unit 54 calculates a ratio (R) between the current time required to reach the ultimate value (t2−t1) and the average time Ts as follows:

$$R=(t2-t1)/Ts$$

The status determination unit 54 evaluates the level of the status of the electric power tool 1, and, in this case, the level of deterioration, in accordance with the R value. When the R value is equal to or greater than a predetermined value (e.g., 1.25), the status determination unit 54 may determine that the electric power tool 1 is in a heavily deteriorated status. Step-wise levels of deterioration may be defined for a plurality of R values. The level of deterioration may be evaluated in accordance with a difference between the current time required to reach the ultimate value (t2−t1) and the average time Ts.

When the status determination unit 54 determines that the electric power tool 1 is in a deteriorated status, it is preferred to identify a deteriorated portion in the electric power tool 1. In the embodiment, the electric power tool 1 transmits, as physical quantity data, the tightening torque data, electric current data, motor revolution data, and vibration data acquired at the points of time t1–t2. When at least one of these items of physical quantity data indicates abnormality, the status determination unit 54 determines a deteriorated portion in the electric power tool 1. Whether the data indicates normal or abnormal may be judged by comparing the data with reference data. Alternatively, a judgment may be made through a comparison with the past physical quantity data stored in the storage apparatus 56 in association with the same electric power tool 1. Several cases in which a deteriorated portion is identified will be discussed.
(Case 1)

When the electric current data is normal and the revolution data is abnormal, the status determination unit 54 may determine that the motor 4 is not rotated normally and that the deteriorated portion is the motor 4.
(Case 2)

When the electric current data and the revolution data are normal, the status determination unit 54 determines that the motor 4 is normal. When the vibration data is abnormal in this case, the status determination unit 54 determines that the power transmission mechanism 6 has become loose and identifies the power transmission mechanism 6 as the deteriorated portion.
(Case 3)

When the electric current data and the revolution data are normal, the status determination unit 54 determines that the motor 4 is normal. When the tightening torque data is abnormal in this case, the status determination unit 54 determines that abnormality occurs in the impact mechanism in the power transmission mechanism 6 and identifies the impact mechanism as the deteriorated portion.

Cases 1-3 are by way of examples only, and the deteriorated portion may be determined according to other cases.

The notification unit 55 causes the transmission unit 53 to transmit determination data indicating the determination result yielded by the status determination unit 54 to the electric power tool 1. The determination data includes data indicating that the electric power tool 1 is in a deteriorated status and data indicating the identified deteriorated portion. When the status determination unit 54 does not determine that the electric power tool 1 is deteriorated, it is not necessary for the notification unit 55 to cause the transmission unit 53 to transmit the determination data. In other words, the transmission unit 53 may transmit the determination data to the electric power tool 1 only when the status determination unit 54 determines that the electric power tool 1 is in a deteriorated status.

In the electric power tool 1, the reception unit 17 receives the transmitted determination data. The notification control unit 14 causes the notification interface 18 to communicate the determination data. The notification interface 18 provides an audio output of the determination result from the speaker or provides a screen output of the determination result from a display. The user can know that the electric power tool 1 is deteriorated and know the deteriorated portion by referring to the content communicated from the notification interface 18 and can address the issue by, for example, sending the tool for repair when necessary.

The notification control unit 14 causes the notification interface 18 to notify that the electric power tool 1 is in a deteriorated status and indicate the deteriorated portion while the motor 4 is not being rotated. That the motor 4 is being rotated means that a tightening work is proceeding, and the user may not notice if the notification interface 18 provides notification. Meanwhile, it is preferred to communicate the determination result indicating that the tool is in a deteriorated status immediately to the user. Thus, the notification control unit 14 causes the notification interface 18 to output the determination result immediately unless the motor 4 is being rotated when the reception unit 17 receives the determination data. If the motor 4 is being rotated when the reception unit 17 receives the determination data, the notification control unit 14 causes the notification interface 18 to output the determination result immediately after the rotation of the motor 4 is terminated. By using the notification control unit 14 to control the timing of notification in this way, the user can properly know that the electric power tool 1 is in a deteriorated status.

The notification control unit 14 may cause the notification interface 18 to communicate that the electric power tool 1 is in a deteriorated status and communicate the deteriorated portion when the user operation switch 9 is not turned on. The motor control unit 12 according to the embodiment automatically stops the rotation of the motor 4 when the tightening torque value reaches the target torque value. Thereafter, the user turns the user operation switch 9 off and removes the front-end tool from the work. By using the notification interface 18 to communicate that the electric power tool 1 is in a deteriorated status and communicate the deteriorated portion at a point of time immediately after the user turns the user operation switch 9 off, the user can properly know the information related to deterioration.

Described above is a case in which the server system 50 in the electric power tool system 100 determines that the electric power tool 1 is deteriorated. A description will be given below of a case in which the electric power tool 1 determines that the electric power tool 1 is deteriorated on its own.

Figure 5:
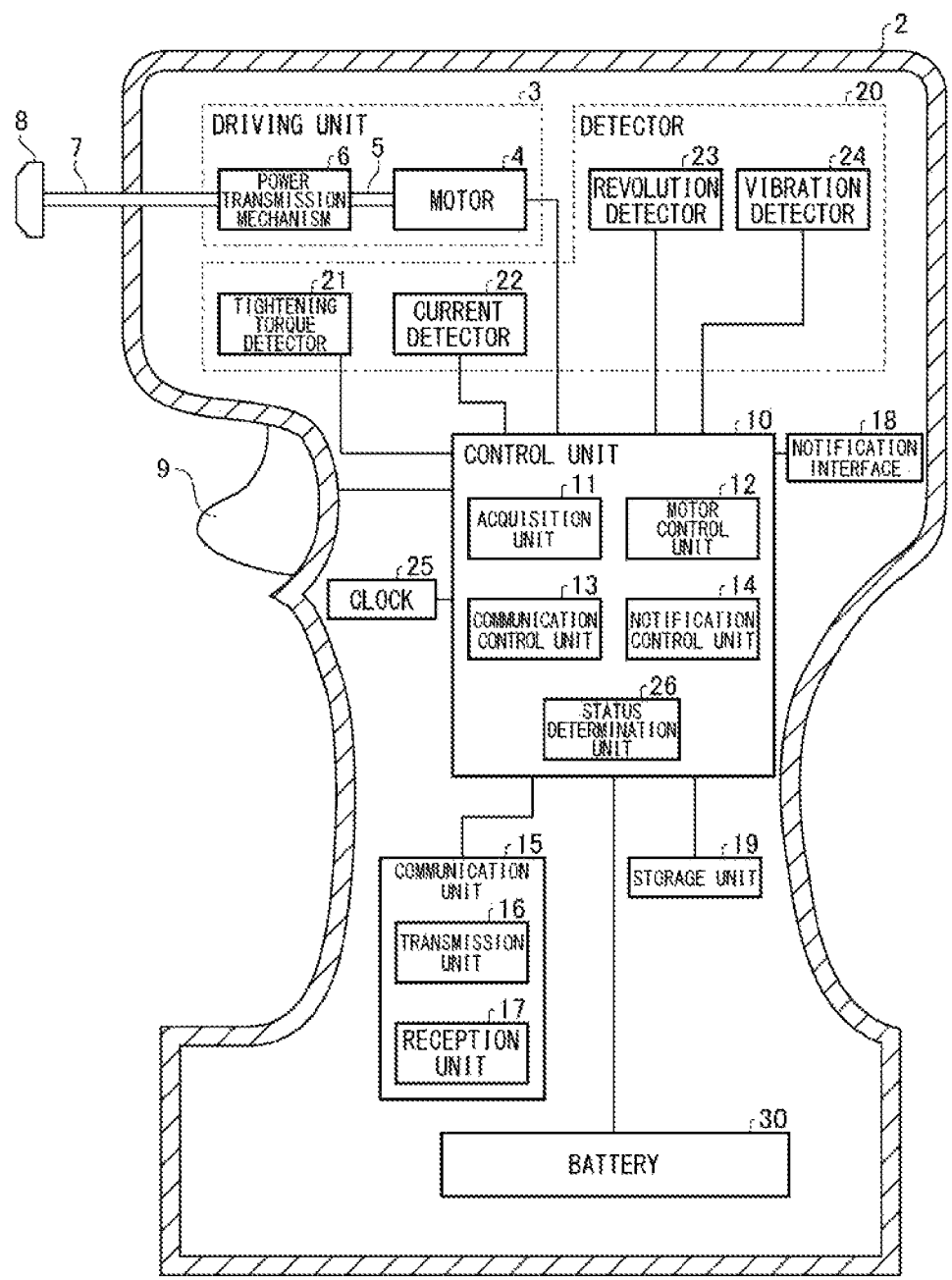
FIG. 5 shows alternative functional blocks of an electric power tool according to the embodiment.

FIG. 5 shows alternative functional blocks of an electric power tool 1a according to the embodiment. The electric power tool 1a includes the driving unit 3, the control unit 10, the communication unit 15, the notification interface 18, the storage unit 19, the detector 20, the clock 25, and the battery 30. The clock 25 is a real-time clock. The clock 25 generates current date and time information and supplies the information to the control unit 10. In the electric power tool 1 shown in FIG. 2 and the electric power tool 1a shown in FIG. 5, features denoted by the same symbol have the same function. Therefore, a description of those features of the electric power tool 1a denoted by the same symbols is omitted as appropriate. A difference from the electric power tool 1 shown in FIG. 2 is that the electric power tool 1a shown in FIG. 5 includes a status determination unit 26 and has the function of determining the level of deterioration on its own.

The driving unit 3 includes the motor 4, the output shaft 7 on which a front-end tool is adapted to be mounted, and the power transmission mechanism 6 that transmits a rotational output of the motor 4 to the output shaft 7. The motor control unit 12 controls the rotation of the motor 4 in accordance with the on operation of the user operation switch 9 performed by the user. The detector 20 detects physical quantity data in the electric power tool 1a while the motor 4 is being rotated. The acquisition unit 11 acquires physical quantity data detected while the motor 4 is being rotated and stores the physical quantity data and time information related to the time when the physical quantity data is acquired in the storage unit 19, mapping the data and the information to each other.

As described above, the control unit 10 in the electric power tool 1a includes the status determination unit 26. The status determination unit 26 reads the physical quantity data and the time information from the storage unit 19 and determines whether the current physical quantity data of the electric power tool 1a shows deterioration. When the status determination unit 26 determines that the electric power tool 1a is in a deteriorated status, the status determination unit 26 identifies a deteriorated portion in the electric power tool 1a.

Determination on deterioration and identification of a deteriorated portion performed by the status determination unit 26 may be the same as the determination on deterioration and identification of a deteriorated portion described with reference to the status determination unit 54 in the server system 50. It has been described that the status determination unit 54 of the electric power tool 1*a* identifies a deteriorated portion in the electric power tool 1*a* when at least one of the items of physical quantity data indicates abnormality. It has been described that whether the data indicates normal or abnormal may be judged by comparing the data with reference data. The status determination unit 26 in the electric power tool 1*a* may be provided with reference data for comparison from the server system 50. The status determination unit 26 may determine whether the current physical quantity data indicates normal or abnormal by comparing the data with the past physical quantity data stored in the storage unit 19. The status determination unit 26 may determine whether each item of the current physical data is normal or abnormal and identify a deteriorated portion according to the criterion of cases 1-3 above.

The notification control unit 14 causes the notification interface 18 to communicate that the electric power tool 1 is in a deteriorated status while the motor 4 is not being rotated. In the case the status determination unit 26 has identified a deteriorated portion in the electric power tool 1, the notification control unit 14 may cause the notification interface 18 to communicate that the electric power tool 1 is in a deteriorated status and communicate the deteriorated portion simultaneously. That the motor 4 is being rotated means that a tightening work is proceeding, and the user may not notice if the notification interface 18 provides notification. By causing the notification interface 18 to communicate information related to deterioration while the motor 4 is not being rotated, the user can know that the electric power tool 1 is in a deteriorated status. When the status determination unit 26 does not determine that the electric power tool 1 is deteriorated, the notification interface 18 may not communicate the determination result.

The notification control unit 14 may cause the notification interface 18 to communicate that the electric power tool 1 is in a deteriorated status and communicate the deteriorated portion when the user operation switch 9 is not turned on. The motor control unit 12 according to the embodiment automatically stops the rotation of the motor 4 when the tightening torque value reaches the target torque value. Thereafter, the user turns the user operation switch 9 off and removes the front-end tool from the work. By using the notification interface 18 to communicate that the electric power tool 1 is in a deteriorated status and communicate the deteriorated portion at a point of time immediately after the user turns the user operation switch 9 off, the user can properly know the information related to deterioration.

Described above is an explanation based on an embodiment. The embodiment is intended to be illustrative only and it will be understood by those skilled in the art that various modifications to constituting elements and processes could be developed and that such modifications are also within the scope of the present disclosure. The detector 20 may further include a temperature detector for detecting temperature and a sound detector for detecting sound.

The communication control unit 13 in the electric power tool 1 causes the transmission unit 16 to transmit the detected physical quantity data and the time information to the server system 50 while the motor 4 is not being rotated. Alternatively, the data and the information may be transmitted when the power of the electric power tool 1 is turned on or off.

According to the embodiment, the electric power tool 1*a* determines the level of deterioration on its own, and the transmission unit 16 in the electric power tool 1*a* does not transmit the detected physical quantity data, etc. to the server system 50. In one variation, the transmission unit 16 in the electric power tool 1*a* may transmit the detected physical quantity data, the determination result, etc. to the server system 50.

A summary of an embodiment of the present disclosure is given below. An electric power tool (1*a*) according to an embodiment of the present disclosure includes: a motor (4); an output shaft (7) on which a front-end tool is adapted to be mounted; a power transmission mechanism (6) that transmits a rotational output of the motor to the output shaft; a user operation switch (9) for rotating the motor; a motor control unit (12) that controls rotation of the motor in accordance with an on operation of the user operation switch performed by a user; a detector (20) that detects physical quantity data while the motor is being rotated; a status determination unit (26) that determines whether the electric power tool is in a deteriorated status, by using the physical quantity data; and a notification interface (18) that communicates that the electric power tool is in a deteriorated status while the motor is not being rotated.

The notification interface (18) preferably communicates that the electric power tool is in a deteriorated status when the user operation switch is not turned on. When the status determination unit (26) determines that the electric power tool is in a deteriorated status, the status determination unit (26) preferably identifies a deteriorated portion in the electric power tool, and the notification interface (18) preferably communicates an identified portion.

An electric power tool system (100) according to another embodiment of the present disclosure includes an electric power tool (1) and a server system (50). The electric power tool (1) may include: a motor (4); an output shaft (7) on which a front-end tool is adapted to be mounted; a power transmission mechanism (6) that transmits a rotational output of the motor to the output shaft; a user operation switch (9) for rotating the motor; a motor control unit (12) that controls rotation of the motor in accordance with an on operation of the user operation switch performed by a user; a detector (20) that detects physical quantity data while the motor is being rotated; and a tool-side transmission unit (16) that transmits the physical quantity data to the server system while the motor is not being rotated. The server system (50) may include: a server-side reception unit (52) that receives the physical quantity data transmitted; a status determination unit (54) that determines whether the electric power tool is in a deteriorated status, by using the physical quantity data; and a server-side transmission unit (53) that transmits determination data yielded by the status determination unit to the electric power tool (1). The electric power tool (1) may include: a tool-side reception unit (17) that receives the determination data transmitted; and a notification interface (18) that communicates that the electric power tool is in a deteriorated status while the motor is not being rotated.

The notification interface (18) preferably communicates that the electric power tool is in a deteriorated status when the user operation switch is not turned on. When the status determination unit (54) determines that the electric power tool is in a deteriorated status, the status determination unit (54) may identify a deteriorated portion in the electric power tool, and the notification interface (18) may communicate an identified portion.

INDUSTRIAL APPLICABILITY

The present disclosure can be used in the fields of electric power tools and management of the status of electric power tools.

REFERENCE SIGNS LIST 1, 1a . . . electric power tool, 3 . . . driving unit, 4 . . . motor, 5 . . . motor shaft, 6 . . . power transmission mechanism, 7 . . . output shaft, 9 . . . user operation switch, 10 . . . control unit, 11 . . . acquisition unit, 12 . . . motor control unit, 13 . . . communication control unit, 14 . . . notification control unit, 15 . . . communication unit, 16 . . . transmission unit, 17 . . . reception unit, 18 . . . notification interface, 19 . . . storage unit, 20 . . . detector, 26 . . . status determination unit, 50 . . . server system, 51 . . . communication unit, 52 . . . reception unit, 53 . . . transmission unit, 54 . . . status determination unit, 55 . . . notification unit, 56 . . . storage apparatus, 100 . . . electric power tool system

The invention claimed is:

1. An electric power tool comprising:
a motor;
an output shaft on which a front-end tool is adapted to be mounted;
a power transmission mechanism that transmits a rotational output of the motor to the output shaft;
a user operation switch for rotating the motor;
a motor control unit that controls rotation of the motor in accordance with an on operation of the user operation switch performed by a user;
a detector that detects physical quantity data which includes at least one of tightening torque data, electric current data, motor revolution data, or vibration data while the motor is being rotated;
a status determination unit that determines whether the electric power tool is in a deteriorated status where the electric power tool does not operate properly, by using the physical quantity data; and
a notification interface that outputs a notification indicating that the electric power tool is in the deteriorated status while the motor is not being rotated,
wherein the notification interface does not output the notification while the motor is being rotated, and the notification interface outputs the notification immediately after the user release the on operation of the user operation switch.

2. The electric power tool according to claim 1, wherein the notification interface outputs the notification when the user operation switch is not turned on.

3. The electric power tool according to claim 1, wherein:
when the status determination unit determines that the electric power tool is in the deteriorated status, the status determination unit identifies a deteriorated portion in the electric power tool, and
the notification interface outputs information indicating the identified portion.

4. An electric power tool system including an electric power tool and a server system,
the electric power tool including:
a motor;
an output shaft on which a front-end tool is adapted to be mounted;
a power transmission mechanism that transmits a rotational output of the motor to the output shaft;
a user operation switch for rotating the motor;
a motor control unit that controls rotation of the motor in accordance with an on operation of the user operation switch performed by a user;
a detector that detects physical quantity data which includes at least one of tightening torque data, electric current data, motor revolution data, and vibration data while the motor is being rotated; and
a tool-side transmission unit that transmits the physical quantity data detected to the server system while the motor is not being rotated, and
the server system including:
a server-side reception unit that receives the physical quantity data transmitted;
a status determination unit that determines whether the electric power tool is in a deteriorated status where the electric power tool does not operate properly, by using the physical quantity data; and
a server-side transmission unit that transmits determination data yielded by the status determination unit to the electric power tool, and
the electric power tool including:
a tool-side reception unit that receives the determination data transmitted; and
a notification interface that outputs a notification indicating that the electric power tool is in the deteriorated status while the motor is not being rotated, wherein:
if the motor is not being rotated when the tool-side reception unit receives the determination data, the notification interface outputs the notification immediately, and
if the motor is being rotated when the tool-side reception unit receives the determination data, the notification interface outputs the notification immediately after the user release the on operation of the user operation switch.

5. The electric power tool system according to claim 4, wherein
the notification interface outputs the notification when the user operation switch is not turned on.

6. The electric power tool system according to claim 4, wherein: when the status determination unit determines that the electric power tool is in a
deteriorated status, the status determination unit identifies a deteriorated portion in the electric power tool, and
the notification interface outputs information indicating the identified portion.

\* \* \* \* \*